United States Patent
Ko et al.

(10) Patent No.: US 12,238,657 B2
(45) Date of Patent: Feb. 25, 2025

(54) METHOD AND DEVICE FOR TRANSMITTING S-SSB IN NR V2

(71) Applicant: LG ELECTRONICS INC., Seoul (KR)

(72) Inventors: Woosuk Ko, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 17/636,269

(22) PCT Filed: Aug. 19, 2020

(86) PCT No.: PCT/KR2020/011010
§ 371 (c)(1),
(2) Date: Feb. 17, 2022

(87) PCT Pub. No.: WO2021/034090
PCT Pub. Date: Feb. 5, 2021

(65) Prior Publication Data
US 2022/0295426 A1    Sep. 15, 2022

Related U.S. Application Data
(60) Provisional application No. 62/898,541, filed on Sep. 10, 2019.

(30) Foreign Application Priority Data
Aug. 19, 2019    (KR) .................. 10-2019-0100937

(51) Int. Cl.
H04W 56/00    (2009.01)
H04W 52/52    (2009.01)
H04W 92/18    (2009.01)

(52) U.S. Cl.
CPC ......... *H04W 56/001* (2013.01); *H04W 52/52* (2013.01); *H04W 92/18* (2013.01)

(58) Field of Classification Search
CPC ..... H04W 56/001; H04W 4/40; H04W 52/52; H04W 56/00; H04W 48/12; H04W 92/18; H04J 11/00; H04L 27/26025; H04L 5/00
See application file for complete search history.

(56) References Cited

U.S. PATENT DOCUMENTS

2020/0015214 A1*  1/2020  Si ..................... H04L 27/26025

FOREIGN PATENT DOCUMENTS

KR    1020170112799    10/2017

OTHER PUBLICATIONS

Qualcomm Incorporated ("Sidelink Resource Allocation Mechanism for NR V2X", 3GPP TSG WG1 Meeting #95, R1-1813424, Nov. 12-16, 2018) (Year: 2018).*

(Continued)

*Primary Examiner* — Ji-Hae Yea
(74) *Attorney, Agent, or Firm* — BRYAN CAVE LEIGHTON PAISNER LLP

(57) ABSTRACT

An operating method of a first device in a wireless communication system is presented. The method comprises the steps of: generating a sidelink synchronization signal block (S-SSB), wherein symbols related to the S-SSB include three or more contiguous symbols related to a sidelink primary synchronization signal (S-PSS), three or more contiguous symbols related to a sidelink secondary synchronization signal (S-SSS), and 11 or more PSBCH symbols related to a PSBCH, the S-PSS is mapped to symbols after a first symbol from among the symbols related to the S-SSB, the S-SSS is mapped to symbols after symbols related to the S-PSS from among the symbols related to the S-SSB, and the PSBCH is mapped to the first symbol from among the (Continued)

symbols related to the S-SSB and to symbols after symbols related to the S-SSS; and transmitting the S-SSB to a second device.

14 Claims, 24 Drawing Sheets

(56) References Cited

OTHER PUBLICATIONS

CATT ("On design and evaluation of S-SSB for Nr V2X Sidelink", 3GPP TSG RAN WG1 Meeting #96bis, R1-1905354, Apr. 8-12, 2019) (Year: 2019).*
Huawei, HiSilicon ("Sidelink synchronization mechanisms for NR V2X", 3GPP TSG RAN WG1 Meeting #98, R1-1908043, Aug. 26-30, 2019) (Year: 2019).*
Huawei et al., Sidelink synchronization for NR V2X, R1-1908043, 3GPP TSG RAN WG1 Meeting #98, Prague, Czech Republic, Aug. 17, 2019, see sections 2 and 3.1-3.2, and figures 1 and 3.
Catt, On design and evaluation of S-SSB for NR V2X Sidelink, R1-1905354, 3GPP TSG RAN WG1 Meeting #96bis, Xi'an, China, Apr. 3, 2019, see sections 2.1.2 and 2.2.3.
Ericsson, On Details of S-SSB design, R1-1905503, 3GPP TSG-RAN WG1 Meeting #96bis, Xi'an, China, Apr. 2, 2019, see sections 2.1-2.2.
NTT Docomo, Inc., Sidelink synchronization mechanism for NR V2X, R1-1902800, 3GPP TSG RAN WG1 #96, Athens, Greece, Feb. 16, 2019, see sections 2.1-2.2; and figure 2.

* cited by examiner

FIG. 4
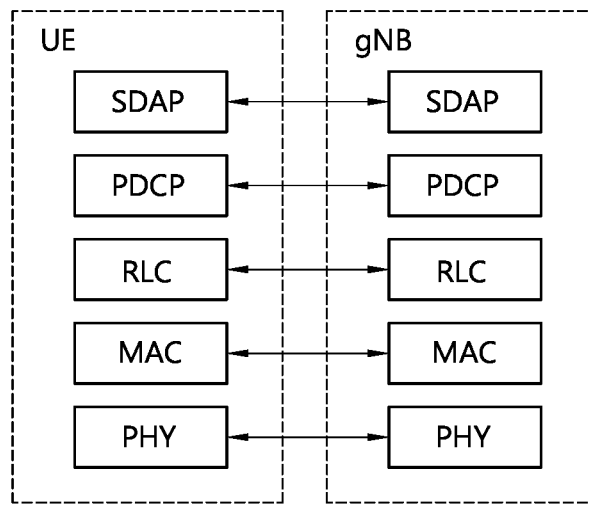
(a)
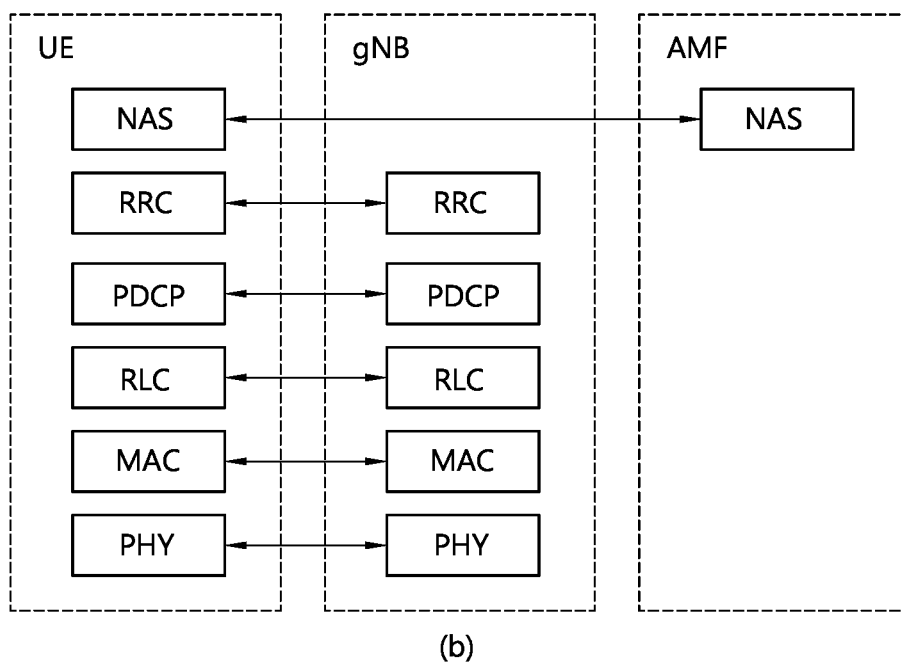
(b)

FIG. 8
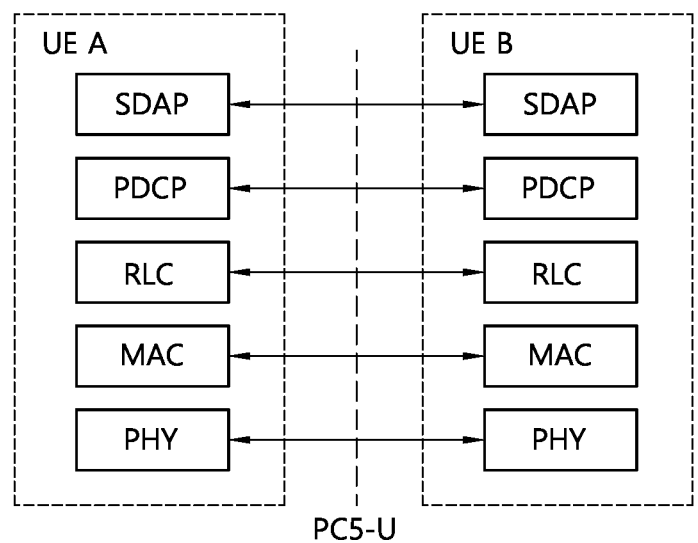
(a)
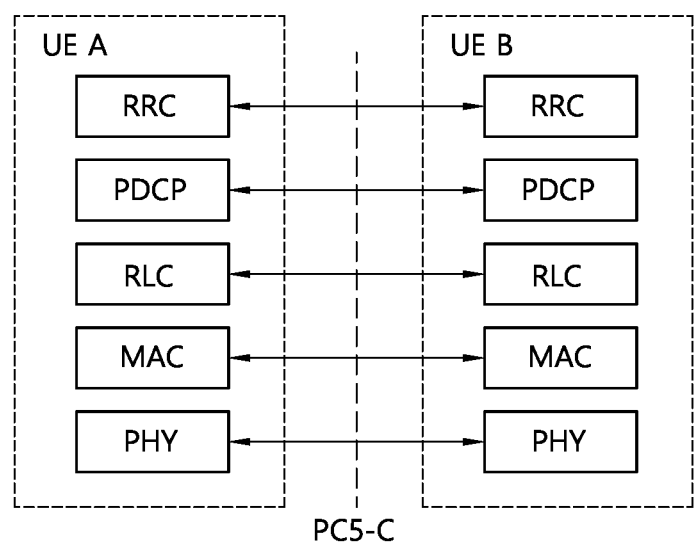
(b)

FIG. 10
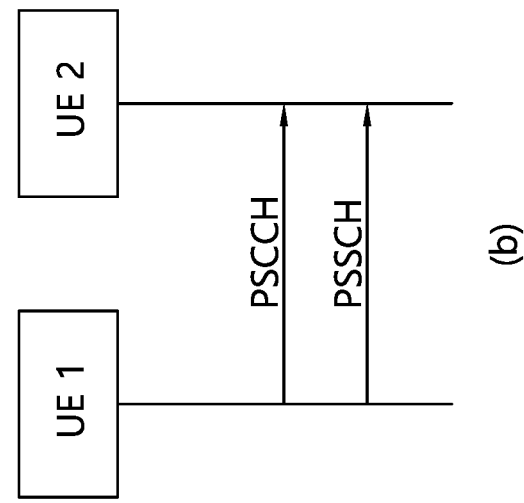
(b)
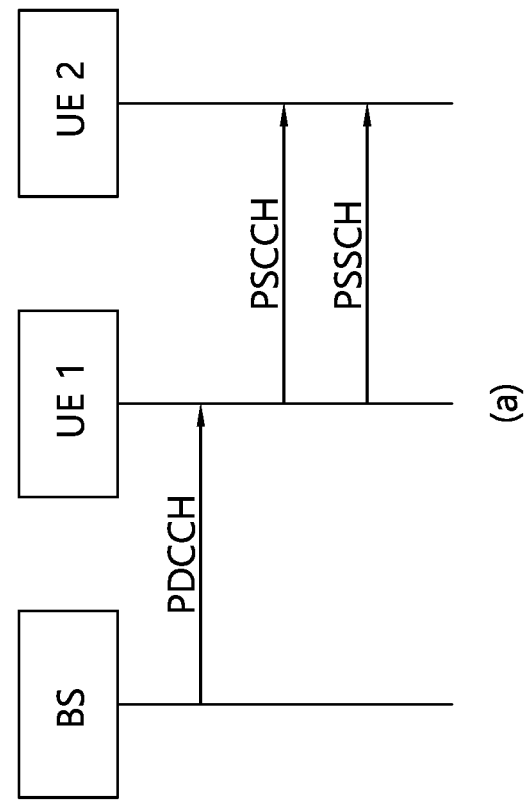
(a)

FIG. 17 receiving an S-SSB from a first apparatus —S1710

METHOD AND DEVICE FOR TRANSMITTING S-SSB IN NR V2

This application is the National Stage filing under 35 U.S.C. 371 of International Application No. PCT/KR2020/011010 filed on Aug. 19, 2020, which claims priority to U.S. Provisional Application No. 62/898,541 filed on Sep. 10, 2019 and Korean Patent Application No. 10-2019-0100937 filed on Aug. 19, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment, a method of operating a first apparatus 100 in a wireless communication system is proposed. The method may comprise: generating an S-SSB; and transmitting the S-SSB to a second apparatus 200.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 10 shows a procedure of performing V2X or SL communication by a UE based on a transmission mode, in accordance with an embodiment of the present disclosure.

FIG. 17 shows a procedure in which a second apparatus receives an S-SSB, according to an embodiment of the present disclosure.

DESCRIPTION OF EXEMPLARY EMBODIMENTS

Figure 1:
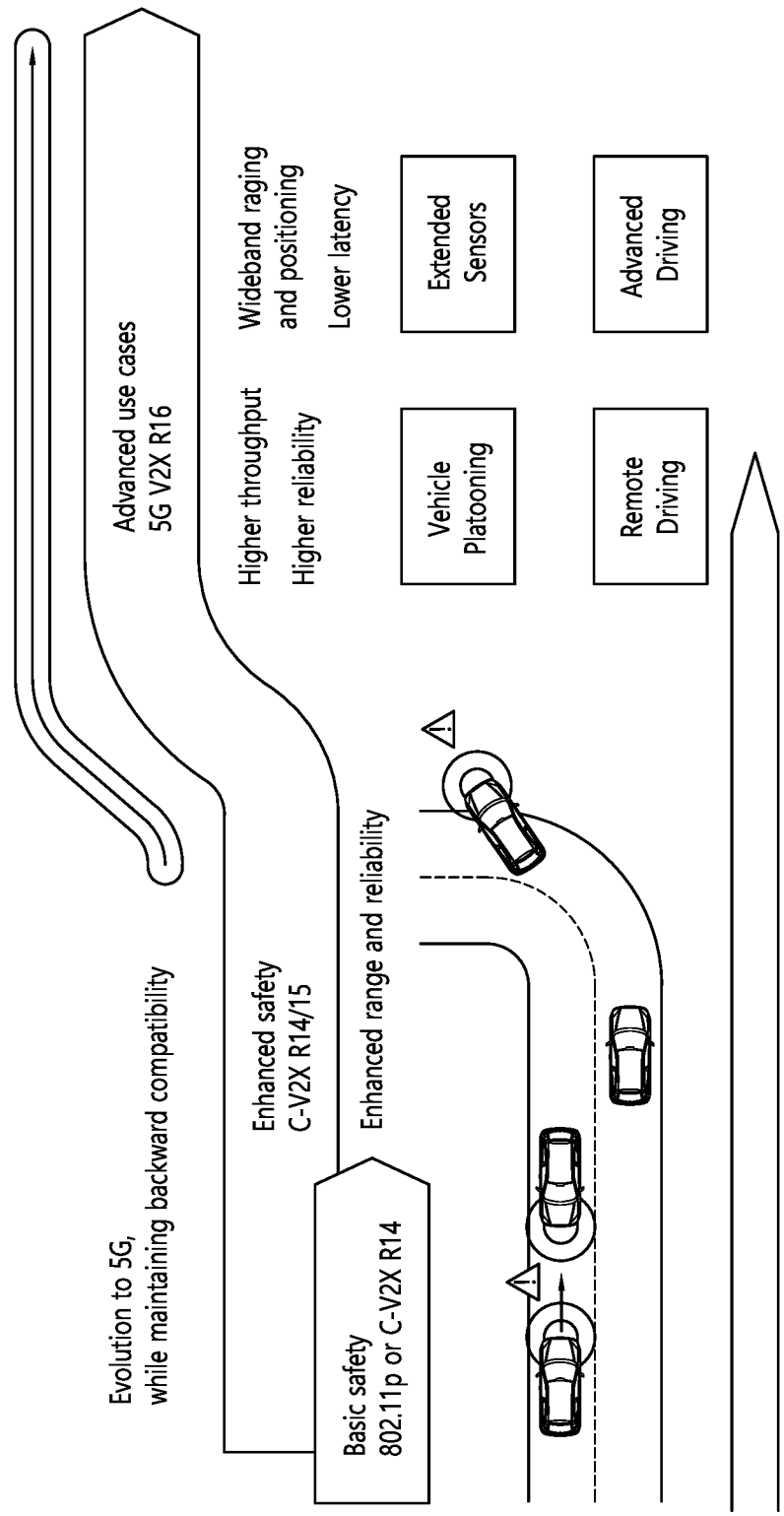
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
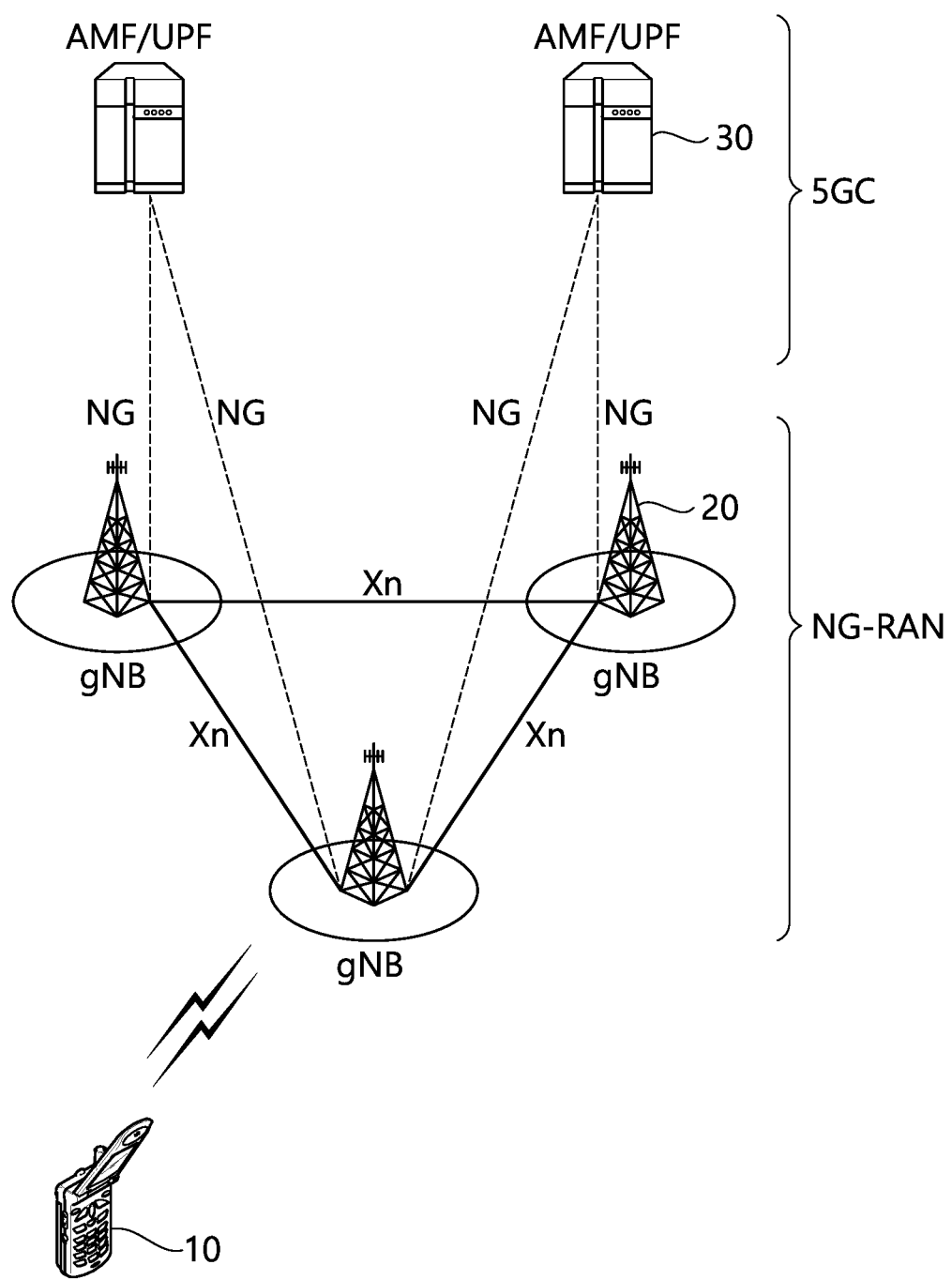
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
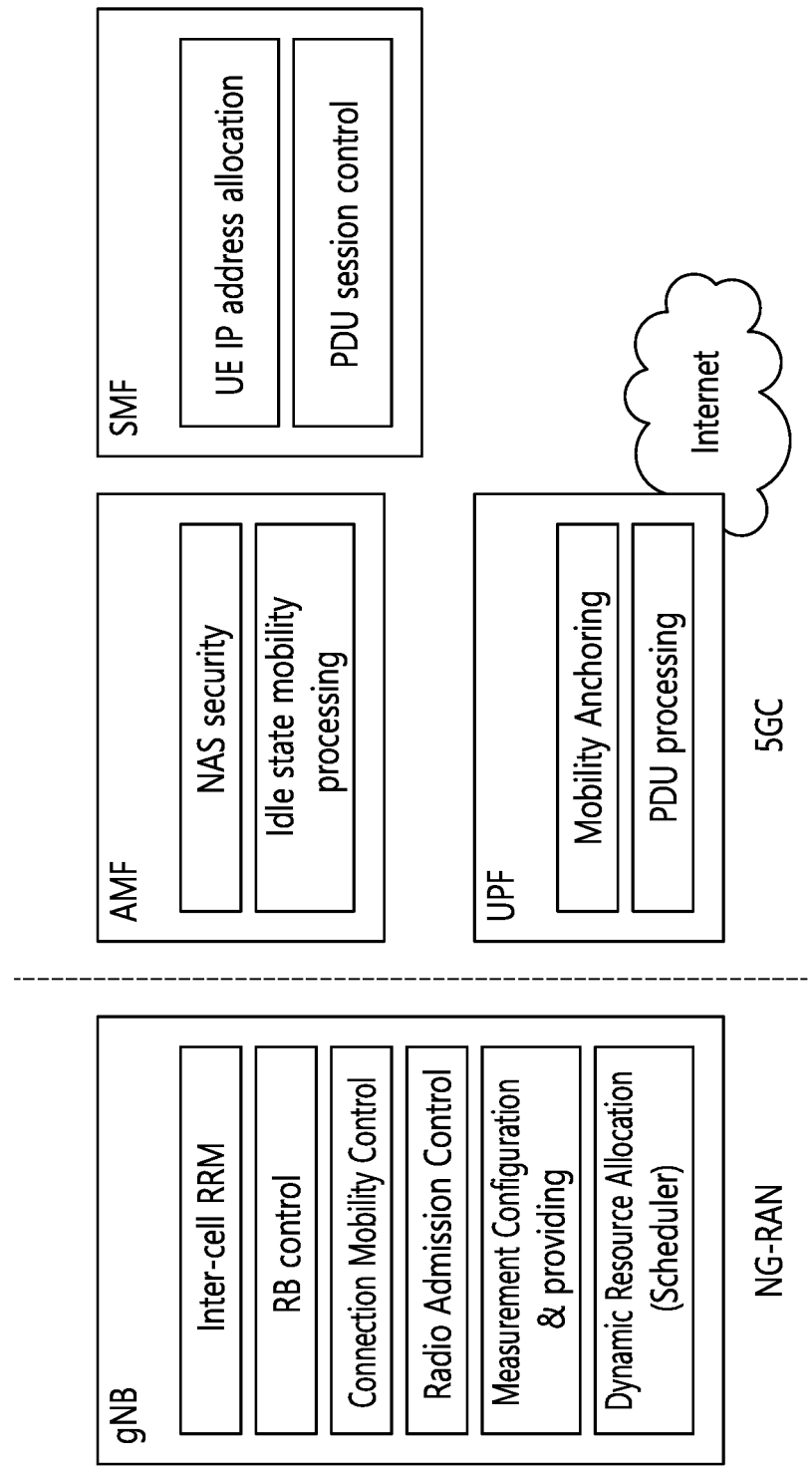
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
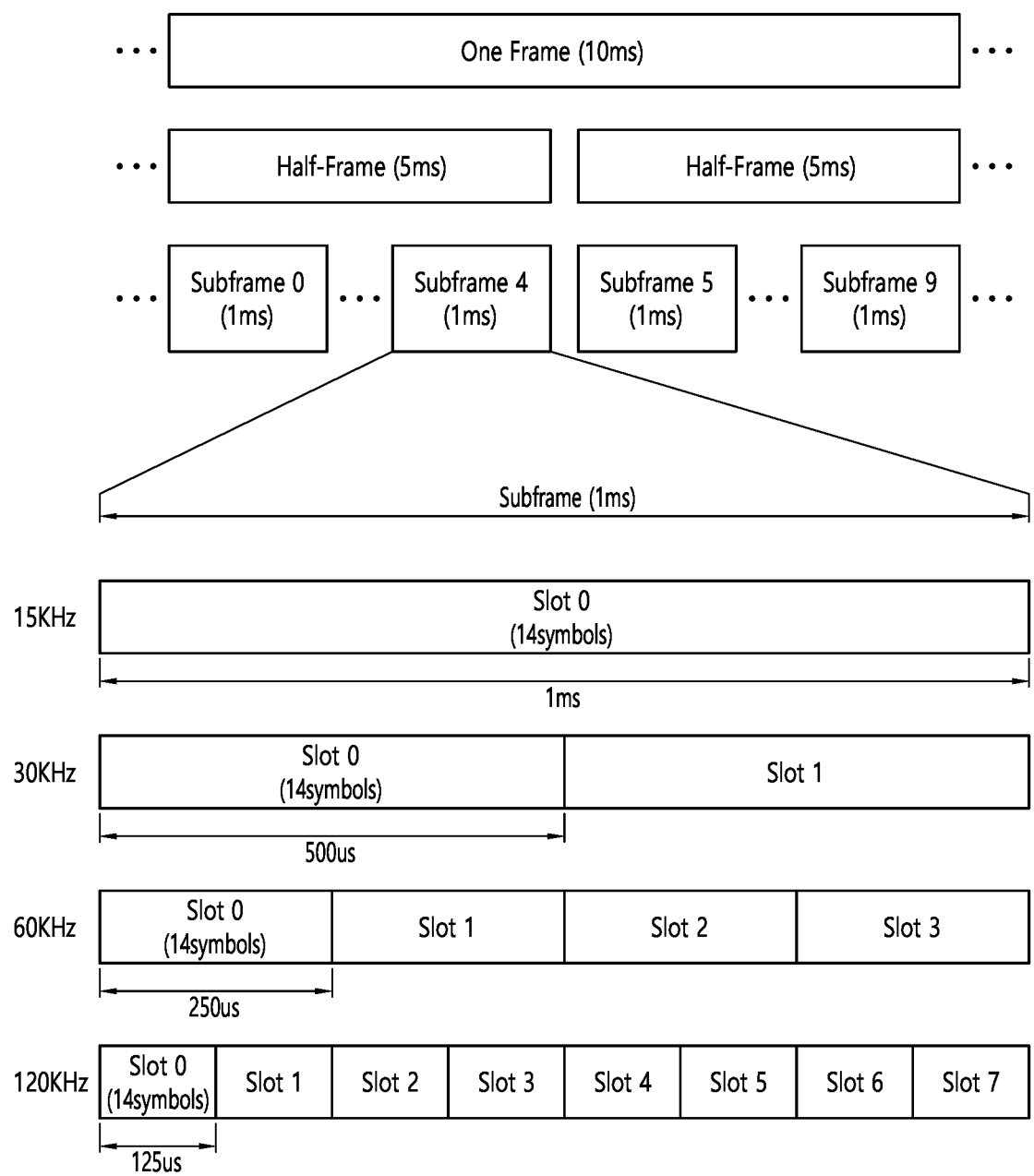
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,\mu}_{slot}$), and a number of slots per subframe ($N^{subframe,\mu}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

TABLE 2-continued

| SCS ($15*2^u$) | $N^{slot}_{symb}$ | $N^{frame, u}_{slot}$ | $N^{subframe, u}_{slot}$ |
|---|---|---|---|

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher.

For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
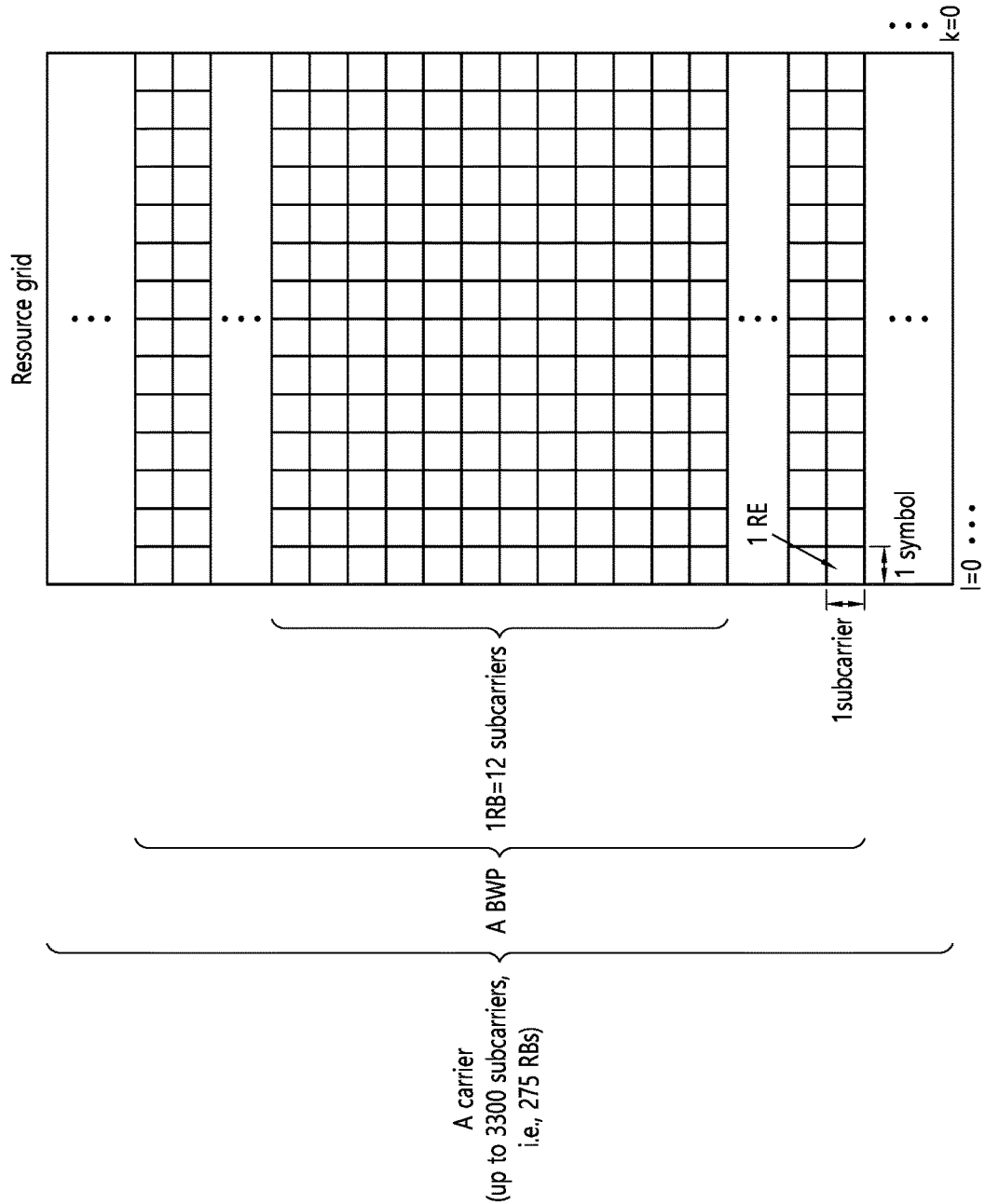
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
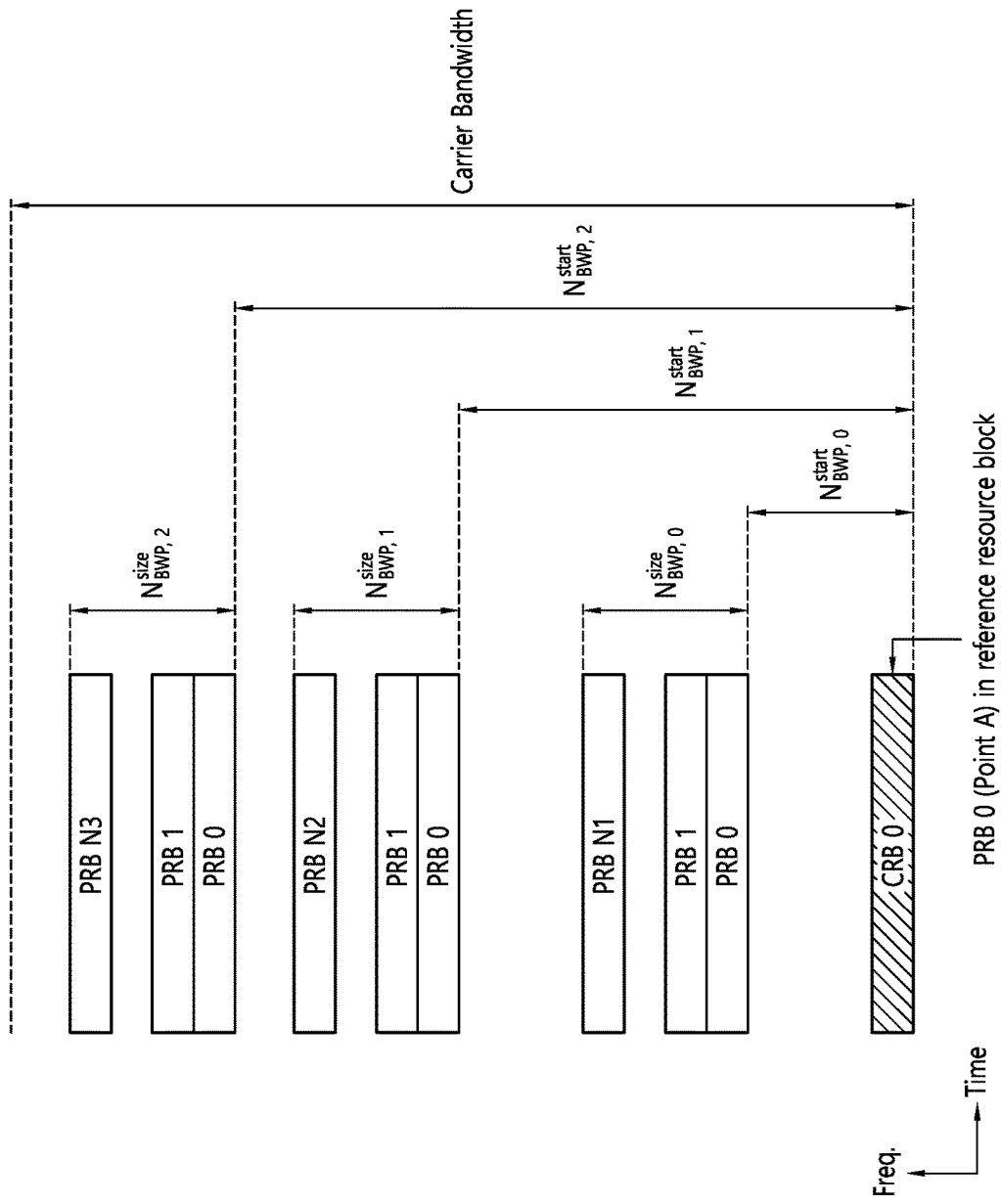
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
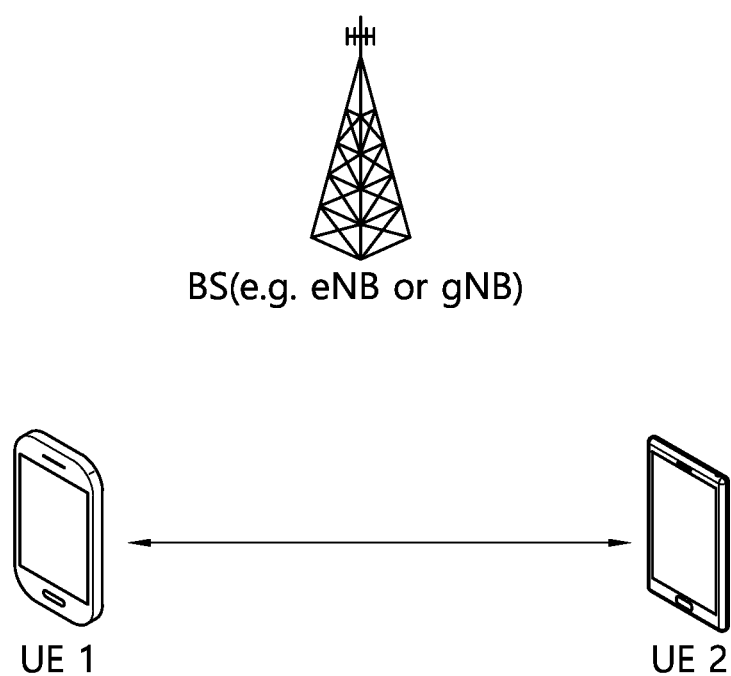
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
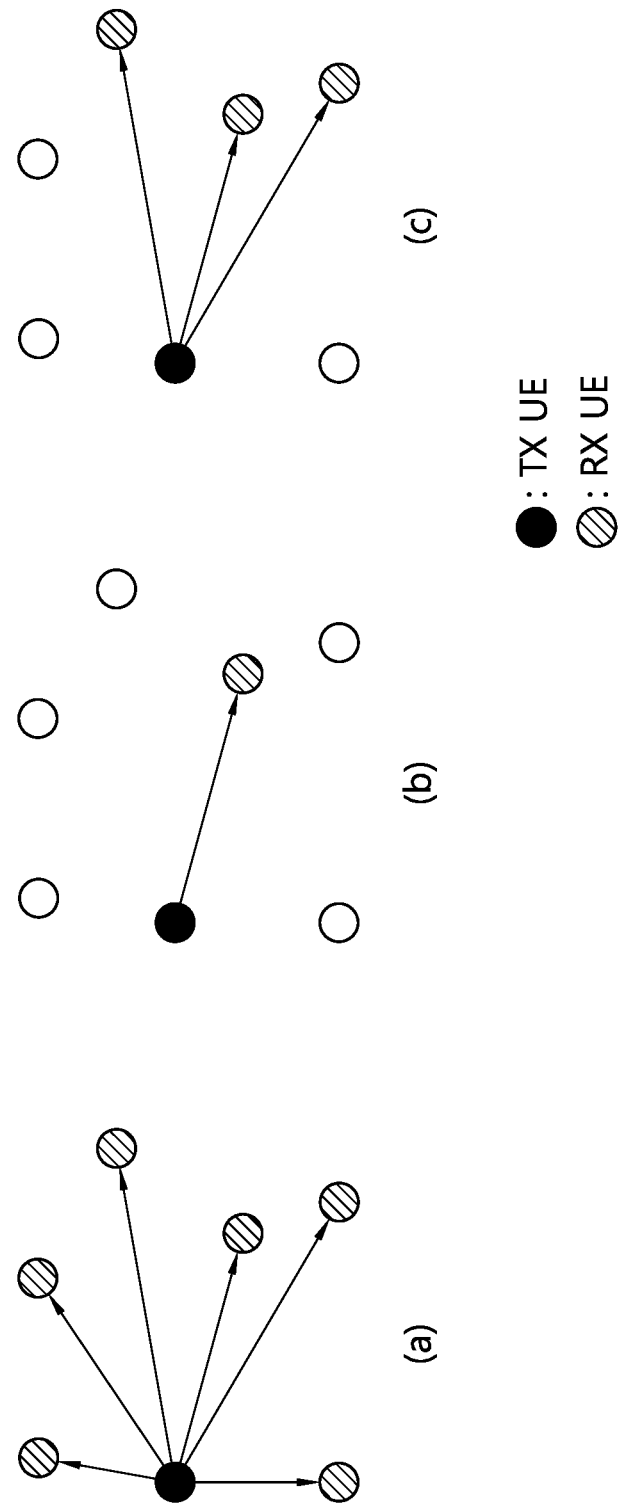
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

In NR V2X communication system, sidelink synchronization signal block (S-SSB) or sidelink SS/PSBCH block used for initial access of a UE may include sidelink primary synchronization signal, S-PSS, sidelink secondary synchronization signal, S-SSS, and sidelink physical broadcast channel, PSBCH. An S-PSS may be used for the purpose of a UE obtaining initial signal detection and synchronization. An S-SSS may be used by a UE together with an S-PSS signal to obtain detailed synchronization and to detect a synchronization signal identifier (ID). A PSBCH may be a channel used by a UE to receive basic system information through a Master Information Block (MIB). Therefore, an S-PSS, an S-SSS, and a PSBCH included in a synchronization signal block may be very important signals for a UE to obtain synchronization and basic system information, for normal data communication, a UE may have to initially receive and decode an S-SSB.

As described above, since it is important for a UE to receive an S-SSB for sidelink communication, an S-SSB may be designed to maximize reception and decoding performance. For example, the design process of an S-SSB may include a process of optimizing transmission power according to characteristics of each signal constituting the SSB. In other words, according to the peak to average power ratio (PAPR) of each signal constituting an S-SSB, a UE may adjust the maximum power reduction (MPR) that determines the transmission power of the actual signal. In this case, when PAPR values of each signal constituting an S-SSB are different, the required MPR value may be different for each signal constituting an S-SSB. In this case, in order to maximize an S-SSB reception performance of a receiving UE, when a transmitting UE transmits an S-SSB, the transmitting UE may apply the optimal MPR to each signal constituting the S-SSB. For this reason, for example, in order for a transmitter amplifier of a transmitting UE to perform different amplification operations according to different average powers for each signal constituting an S-SSB, a transition period may be applied. The transition period may preserve a time required for a transmitter amplifier of a transmitting UE to perform a normal operation at the boundary where the power of a transmission signal varies. For example, through the transition period, a transmitter amplifier of a transmitting UE may transition from an amplification operation corresponding to one transmission signal power to an amplification operation corresponding to another transmission signal power.

Meanwhile, when different MPR is applied between S-PSS and S-SSS because the PAPR values of S-PSS and S-SSS are different, a method for maximizing sidelink synchronization signal (SLSS) detection performance of a receiving UE and a method for minimizing overhead due to a transition period need to be proposed. Hereinafter, a method for a transmitting UE to perform S-SSB aggregation and an apparatus supporting the same according to an embodiment of the present disclosure will be described.

According to an embodiment of the present disclosure, a plurality of S-SSBs may be transmitted during a period of a certain length of time. For example, it is assumed herein that a sidelink (SL) communication system supports 15 kHz, 30 kHz, 60 kHz, and 120 kHz subcarrier spacing (SCS). For example, in an SL communication system using 30 kHz SCS, in order for a transmitting UE to obtain the same coverage as the coverage of an S-SSB transmitted in an SL communication system using the 15 kHz SCS, the transmitting UE may have to transmit twice as many S-SSBs as the number of S-SSBs transmitted in the SL communication system using the 15 kHz SCS. For example, in an SL communication system using 60 kHz SCS, in order for a transmitting UE to obtain the same coverage as the coverage of an S-SSB transmitted in an SL communication system using the 15 kHz SCS, the transmitting UE may have to transmit four times the number of S-SSBs transmitted in the SL communication system using the 15 kHz SCS. For example, in an SL communication system using 120 kHz SCS, in order for a transmitting UE to obtain the same coverage as the coverage of an S-SSB transmitted in an SL communication system using the 15 kHz SCS, the transmitting UE may have to transmit 8 times the number of S-SSBs transmitted in the SL communication system using the 15 kHz SCS.

Figure 12:
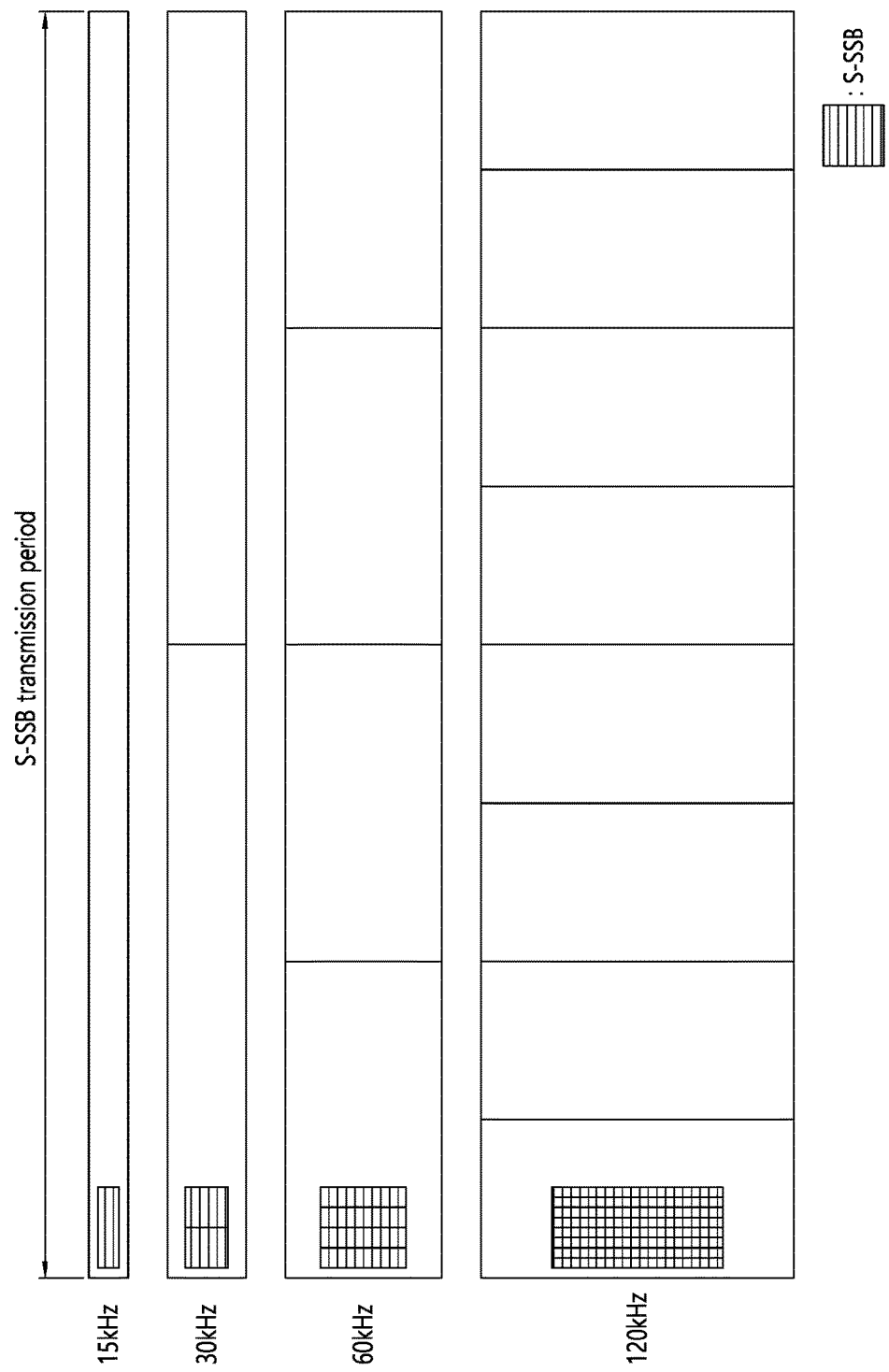
FIG. 12 shows an S-SSB transmission period and the number of S-SSBs transmitted according to SCS according to an embodiment of the present disclosure.

FIG. 12 shows an S-SSB transmission period and the number of S-SSBs transmitted according to SCS according to an embodiment of the present disclosure. The embodiment of FIG. 12 may be combined with various embodiments of the present disclosure.

Referring to FIG. 12, in order to obtain the same coverage for S-SSB transmission, a transmitting UE may transmit one S-SSB in an SL communication system using the 15 kHz SCS, two S-SSBs in an SL communication system using the 30 kHz SCS, four S-SSBs in an SL communication system using the 60 kHz SCS, and 8 S-SSBs in an SL communication system using the 120 kHz.

Reason for transmitting a plurality of S-SSBs in an SL communication system using an SCS of 30 kHz or higher as described above is because under the assumption that a transmitting UE uses the same subcarrier, as the SCS increases, the bandwidth of the entire signal increases, and accordingly, the noise bandwidth also increases, and as a result, the Signal-to-Noise Ratio (SNR) decreases in inverse proportion. Therefore, in order to compensate for the SNR loss, a transmitting UE may have to transmit an S-SSB corresponding to the multiple.

Figure 13:
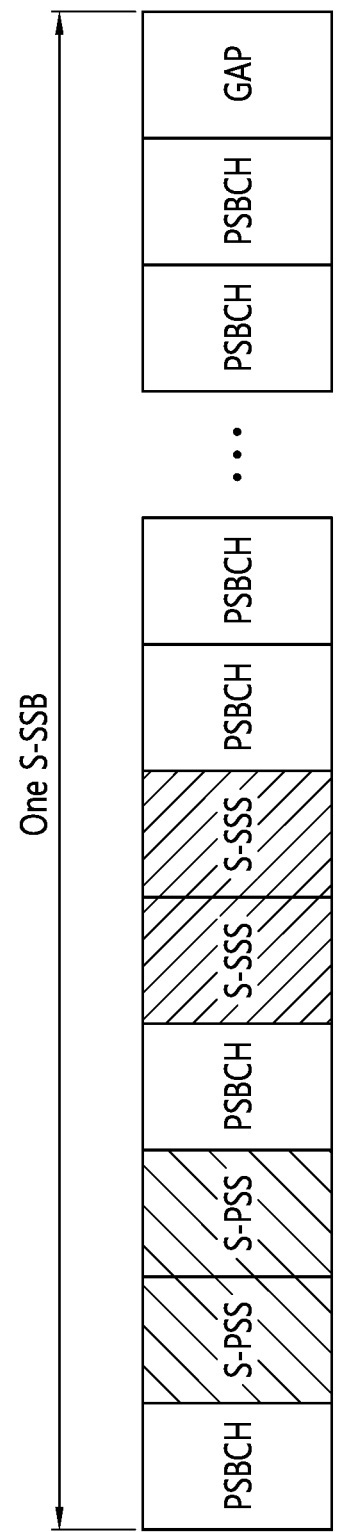
FIG. 13 shows a structure of an S-SSB according to an embodiment of the present disclosure.

According to an embodiment of the present disclosure, from the viewpoint of a transition period to be applied due to the different MPRs of S-PSS and S-SSS, in order not to degrade the detection and decoding performance of S-PSS and S-SSS of a receiving UE, a transition period may have to exist between symbols related to S-PSS and symbols related to S-SSS. In addition, in order for a receiving UE to use channel parameters such as the frequency offset of channel estimated by an S-PSS in an S-SSS detection and decoding process, S-PSS and S-SSS must not be distant from each other in time. From this point of view, according to an embodiment of the present disclosure, an S-SSB structure as shown in FIG. 13 may be used. For example, according to an embodiment of the present disclosure, a transmitting UE may transmit an S-SSB as shown in FIG. 13 to a receiving UE. For example, the last symbol among symbols related to S-SSB may be used as a TX/RX switching gap.

FIG. 13 shows a structure of an S-SSB according to an embodiment of the present disclosure. The embodiment of FIG. 13 may be combined with various embodiments of the present disclosure.

Referring to FIG. 13, symbols related to S-SSB may include symbols related to S-PSS and symbols related to S-SSS, each of which is two contiguous symbols. The reason why two symbols related to S-PSS and two symbols related to S-SSS are used in an S-SSB structure as in the embodiment of FIG. 13 is to improve one-shot detection performance of a receiving UE, compared to PSS and SSS used in Uu communication. Considering a basic safety application in SL communication, it may be a very important requirement for a receiving UE to receive a low latency service through one-shot detection. In the S-SSB structure, a transmitting UE may use symbols related to PSBCH inserted between symbols related to S-PSS and symbols related to S-SSS as a transition period to overcome different MPR levels between the S-PSS and the S-SSS. Since a symbol related to the PSBCH is used as a transition period, the deterioration of the detection performance of S-PSS and S-SSS of a receiving UE can be minimized, and at the same time, overhead due to a transition period may be minimized.

For example, if the S-SSB is an S-SSB that a transmitting UE transmits once every predetermined period in the 15 kHz SCS system, a transmitting UE may have to transmit 2, 4, and 8 S-SSBs at regular intervals in the 30 kHz SCS system, the 60 kHz SCS system, and the 120 kHz SCS system, respectively. For example, in order to satisfy a low latency requirement, a transmitting UE may continuously transmit a plurality of S-SSBs adjacent to each other within a predetermined period. In this case, symbols related to each S-SSB may include symbols related to PSBCH serving as a transition period. For example, a symbol related to PSBCH serving as a transition period may be located between symbols related to S-PSS and symbols related to S-SSS. As the symbol related to the PSBCH serves as a transition period, a part or the entirety of the symbol period related to the PSBCH may be punctured. Accordingly, there may be a problem that a transmitting UE cannot normally transmit a PSBCH through the symbols related to the PSBCH. That is, the symbol related to the corresponding PSBCH mainly serves as a transition period, in the view point of information transmission of a transmitting UE, a symbol related to the PSBCH may be an overhead. Accordingly, when a plurality of S-SSBs are transmitted within a certain period according to the SCS, there may be a disadvantage in that the overhead due to a transition period is also increased by the number of S-SSBs.

Figure 14:
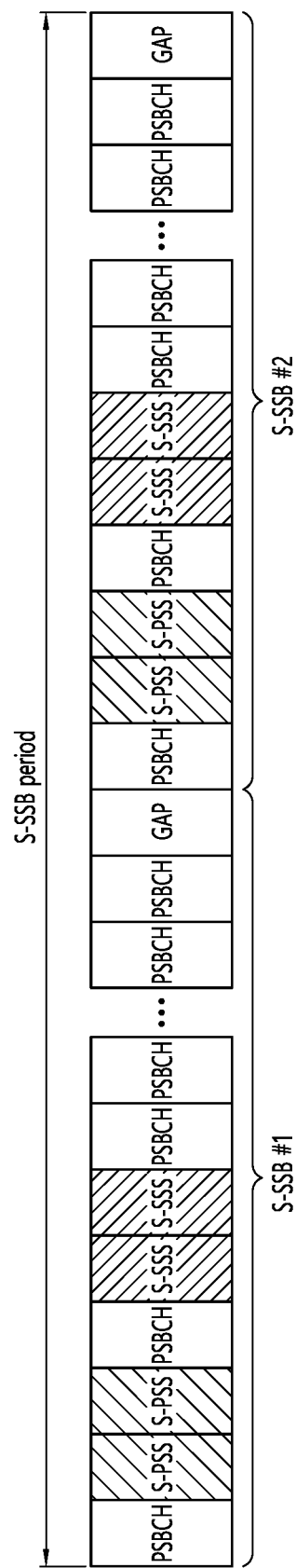
FIG. 14 shows a structure of an S-SSB continuously transmitted according to an embodiment of the present disclosure.

FIG. 14 shows a structure of an S-SSB continuously transmitted according to an embodiment of the present disclosure. FIG. 14 may be combined with various embodiments of the present disclosure.

Referring to FIG. 14, for example, a transmitting UE may transmit two S-SSBs in a 30 kHz SCS system. For example, the two S-SSBs may be transmitted contiguously. For example, a transmitting UE may transmit two S-SSBs within one period, and a problem in which each S-SSB includes a first symbol used as an automatic gain control (AGC) symbol, a symbol related to PSBCH used as a transition period, and an overhead due to a gap symbol, the last symbol, may occur. For example, the first symbol may be a symbol related to the PSBCH. In order to solve this problem, according to an embodiment of the present disclosure, when a transmitting UE transmits a plurality of S-SSBs within a certain period, the transmitting UE may aggregate each S-SSB. For example, the predetermined period may include a period in which a transmitting UE transmits one S-SSB in an SL communication system using 15 kHz SCS.

Figure 15:
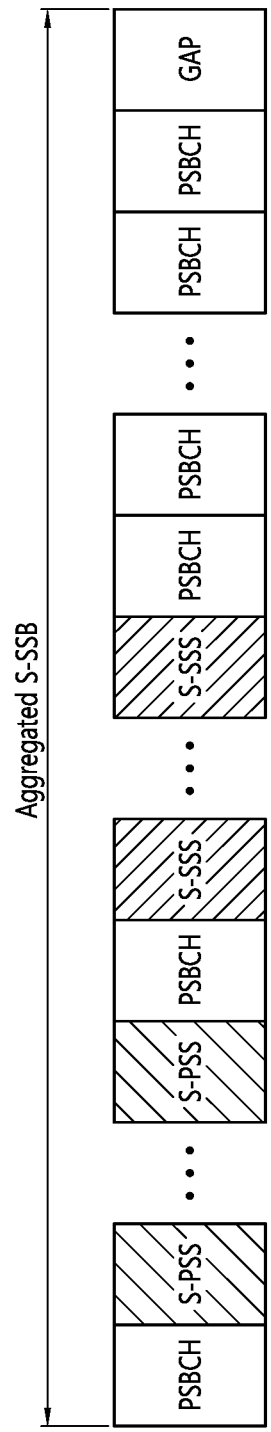
FIG. 15 shows a structure of an S-SSB that a transmitting UE can transmit in a system using an SCS of 30 kHz or higher according to an embodiment of the present disclosure.

FIG. 15 shows a structure of an S-SSB that a transmitting UE can transmit in a system using an SCS of 30 kHz or higher according to an embodiment of the present disclosure. The embodiment of FIG. 15 may be combined with various embodiments of the present disclosure.

Referring to FIG. 15, the S-SSB structure of FIG. 15 is an example of an aggregated S-SSB to which a transmitting UE applies S-SSB aggregation. Referring to FIG. 15, when a transmitting UE transmits a plurality of S-SSBs within a certain period, the transmitting UE may aggregate each S-SSB. For example, aggregating an S-SSB may include generating another S-SSB. Accordingly, a transmitting UE may transmit an S-SSB of the merged structure. In this case, a transmitting UE may generate an S-SSB so that each component related to the same type of signal constituting the S-SSB is located adjacent to each other. For example, each component above may include a symbol. For example, when symbols related to each component constituting an S-SSB are symbols related to the same type of signal, a transmitting UE may adjacently locate symbols related to the same type of signal in the S-SSB, and transmit symbols related to the adjacently located signals. That is, a transmitting UE may configure an S-PSS set by locating all symbols related to an S-PSS to be adjacent, and configure an S-SSS set by locating all the symbols related to an S-SSS set to be adjacent.

Referring to the structure of an aggregated S-SSB of FIG. 15, the aggregated S-SSB may include one symbol serving as an AGC symbol (that is, the first symbol among a plurality of symbols related to PSBCH), one symbol serving as a transition period between symbols related to S-PSS and symbols related to S-SSS (that is, the second symbol among a plurality of symbols related to PSBCH), and one symbol serving as a TX/RX switching gap (that is, the last gap symbol among a plurality of symbols related to PSBCH). That is, if the above-described structure of an aggregated S-SSB is used, overhead compared to the conventional non-aggregated case can be reduced by half. In addition, for example, symbols related to adjacent S-PSS and symbols related to S-SSS may be respectively combined with each other, and through this, a receiving UE may obtain improved detection performance through a combining gain.

According to an aggregated S-SSB structure according to an embodiment of the present disclosure, overhead caused by an AGC symbol, a transition period, and a gap symbol, which increases as the SCS increases, may be reduced. Also, for example, due to a symbol structure in which symbols related to the same signal are adjacent to each other, an effect of increasing an effective symbol duration may occur. In addition, using these characteristics, a transmitting UE may apply a longer sequence corresponding to the entire effective symbol period in which the same symbols are repeated, rather than applying a short sequence to each symbol for the symbol related to S-PSS and each symbol related to S-SSS. For example, when the long sequence is applied, detection performance of S-PSS and S-SSS of a receiving UE may be improved. In addition, taking advantage of, for example, that the sequence detection performance is improved by using a longer sequence, by using a relatively shorter sequence to obtain the same detection performance of S-PSS and S-SSS as in the existing non-aggregation case, a transmitting UE may use a smaller number of symbols related to S-PSS and symbols related to S-SSS than in the case of the existing non-aggregation case as a result. Accordingly, the temporal length of the overall S-SSB signal is shortened, and signaling overhead by an S-SSB in the entire SL communication can be reduced.

According to an embodiment of the present disclosure, the same advantages and effects as those related to the above-described S-PSS and S-SSS may be applied to symbols related to PSBCH. For example, in the case of the existing non-aggregation case, a symbol related to the same PSBCH may be repeated within a plurality of S-SSBs transmitted by a transmitting UE within one period. From a coding gain point of view, this structure has an effect of obtaining a repetition gain. But, from a coding theory point of view, the repetition gain has a lower effect compared to a coding gain based on a code rate. On the other hand, in the aggregated S-SSB structure, a transmitting UE may apply a lower code rate, by using an effective PSBCH symbol duration lengthened by aggregation. Accordingly, a transmitting UE may generate a longer PSBCH codeword. And, when a transmitting UE transmits the codeword through an aggregated PSBCH symbol interval, the transmitting UE can obtain a much higher coding gain. Therefore, as a result, PSBCH decoding performance of a receiving UE can be improved. Or, for example, as in the case of S-PSS and S-SSS above, a transmitting UE may reduce the number of symbols related to PSBCH, which is used to obtain the same performance as the non-aggregation case. Therefore, as a result, signaling overhead by the entire S-SSB can be reduced.

In the present disclosure, when a plurality of S-SSBs are repeatedly transmitted within a certain period according to the SCS used by an SL communication system, a method for minimizing overhead due to an AGC symbol, a transition period, and/or a TX/RX switching gap symbol constituting an S-SSB and improving detection performance and decoding performance of an S-SSB of a receiving UE is proposed. According to the proposed method, a transmitting UE may configure a newly aggregated S-SSB by aggregating the repeatedly transmitted S-SSB. Through this, S-SSB-related detection performance and decoding performance of a receiving UE may be improved, or signaling overhead occupied by an S-SSB in the entire SL signal may be reduced.

Figure 16:
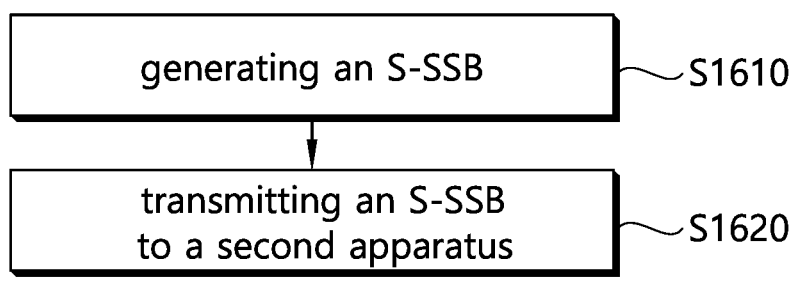
FIG. 16 shows a procedure in which a first apparatus transmits an S-SSB according to an embodiment of the present disclosure.

FIG. 16 shows a procedure in which a first apparatus transmits an S-SSB according to an embodiment of the present disclosure. The embodiment of FIG. 16 may be combined with various embodiments of the present disclosure.

Referring to FIG. 16, in step S1610, a first apparatus may generate a sidelink synchronization signal block (S-SSB). For example, symbols related to the S-SSB may include three or more contiguous symbols related to a sidelink primary synchronization signal (S-PSS), three or more contiguous symbols related to a sidelink secondary synchronization signal (S-SSS), and eleven or more PSBCH symbols related to PSBCH, the S-PSS may be mapped to symbols after the first symbol among the symbols related to the S-SSB, the S-SSS may be mapped to symbols after the symbols related to the S-PSS among the symbols related to the S-SSB, and the PSBCH may be mapped to the first symbol among the symbols related to the S-SSB and symbols after the symbols related to the S-SSS. In step S1620, the first apparatus may transmit the S-SSB to a second apparatus.

For example, the S-SSB may be transmitted with a subcarrier spacing (SCS) of 15 kHz or higher.

For example, the length of a sequence related to the S-PSS may be longer than 127.

For example, the symbols related to the S-SSB may include an S-PSS symbol group, the S-PSS symbol group may include the symbols related to the S-PSS, and the sequence related to the S-PSS may be mapped to the S-PSS symbol group.

For example, the length of a sequence related to the S-SSS may be longer than 127.

For example, the symbols related to the S-SSB may include an S-SSS symbol group, the S-SSS symbol group may include the symbols related to the S-SSS, and the sequence related to the S-SSS may be mapped to the S-SSS symbol group.

For example, the symbols related to the S-SSB may include 14*N symbols, and the N may be an integer greater than or equal to 2.

For example, symbols after the symbols related to the S-SSS among the symbols related to the PSBCH may be contiguous, and a codeword mapped to the symbols after the symbols related to the S-SSS among the symbols related to the PSBCH may be coded at a low code rate.

For example, the symbols related to the S-SSB may include a PSBCH symbol group, the PSBCH symbol group may include the symbols after the symbols related to the S-SSS among the symbols related to the PSBCH, and the codeword may be mapped to the PSBCH symbol group.

For example, automatic gain control (AGC) may be performed in a period related to the first symbol among the symbols related to the S-SSB.

For example, switching may be performed in a period related to the last symbol among the symbols related to the S-SSB.

For example, the symbols related to the S-SSB may include one symbol of the symbols related to the PSBCH between the symbols related to the S-PSS and the symbols related to the S-SSS.

For example, a period related to the one symbol of the symbols related to the PSBCH, included between the symbols related to the S-PSS and the symbols related to the S-SSS may include a transient period.

The above-described embodiment can be applied to various devices to be described below. For example, a processor 102 of a first apparatus 100 may generate a sidelink synchronization signal block (S-SSB). And, for example, the processor 102 of the first apparatus 100 may control a transceiver 106 to transmit the S-SSB to a second apparatus 200.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: generate a sidelink synchronization signal block (S-SSB), wherein symbols related to the S-SSB include three or more contiguous symbols related to a sidelink primary synchronization signal (S-PSS), three or more contiguous symbols related to a sidelink secondary synchronization signal (S-SSS), and eleven or more PSBCH symbols related to PSBCH, wherein the S-PSS is mapped to symbols after the first symbol among the symbols related to the S-SSB, wherein the S-SSS is mapped to symbols after the symbols related to the S-PSS among the symbols related to the S-SSB, and wherein the PSBCH is mapped to the first symbol among the symbols related to the S-SSB and symbols after the symbols related to the S-SSS; and transmit the S-SSB to a second apparatus.

According to an embodiment for the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: generate a sidelink synchronization signal block (S-SSB), wherein symbols related to the S-SSB include three or more contiguous symbols related to a sidelink primary synchronization signal (S-PSS), three or more contiguous symbols related to a sidelink secondary synchronization signal (S-SSS), and eleven or more PSBCH symbols related to PSBCH, wherein the S-PSS is mapped to symbols after the first symbol among the symbols related to the S-SSB, wherein the S-SSS is mapped to symbols after the symbols related to the S-PSS among the symbols related to the S-SSB, and wherein the PSBCH is mapped to the first symbol among the symbols related to the S-SSB and symbols after the symbols related to the S-SSS; and transmit the S-SSB to a second UE.

According to an embodiment for the present disclosure, a non-transitory computer-readable storage medium storing instructions may be proposed. For example, the instructions, when executed, may cause a first apparatus to: generate a sidelink synchronization signal block (S-SSB), wherein symbols related to the S-SSB include three or more contiguous symbols related to a sidelink primary synchronization signal (S-PSS), three or more contiguous symbols related to a sidelink secondary synchronization signal (S-SSS), and eleven or more PSBCH symbols related to PSBCH, wherein the S-PSS is mapped to symbols after the first symbol among the symbols related to the S-SSB, wherein the S-SSS is mapped to symbols after the symbols related to the S-PSS among the symbols related to the S-SSB, and wherein the PSBCH is mapped to the first symbol among the symbols related to the S-SSB and symbols after the symbols related to the S-SSS; and transmit the S-SSB to a second apparatus.

FIG. 17 shows a procedure in which a second apparatus receives an S-SSB, according to an embodiment of the present disclosure. The embodiment of FIG. 17 may be combined with various embodiments of the present disclosure.

Referring to FIG. 17, in step S1710, a second apparatus may receive a sidelink synchronization signal block (S-SSB) from a first apparatus. For example, symbols related to the S-SSB may include three or more contiguous symbols related to a sidelink primary synchronization signal (S-PSS), three or more contiguous symbols related to a sidelink secondary synchronization signal (S-SSS), and eleven or more PSBCH symbols related to PSBCH, the S-PSS may be mapped to symbols after the first symbol among the symbols related to the S-SSB, the S-SSS may be mapped to symbols after the symbols related to the S-PSS among the symbols related to the S-SSB, and the PSBCH may be mapped to the first symbol among the symbols related to the S-SSB and symbols after the symbols related to the S-SSS.

For example, the S-SSB may be received with a subcarrier spacing (SCS) of 15 kHz or higher.

The above-described embodiment can be applied to various devices to be described below. For example, a processor 202 of a second apparatus 200 may control a transceiver 206 to receive a sidelink synchronization signal block (S-SSB) from a first apparatus 100.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers, wherein the one or more processors execute the instructions to: receive a sidelink synchronization signal block (S-SSB) from a first apparatus, wherein symbols related to the S-SSB include three or more contiguous symbols related to a sidelink primary synchronization signal (S-PSS), three or more contiguous symbols related to a sidelink secondary synchronization signal (S-SSS), and eleven or more PSBCH symbols related to PSBCH, wherein the S-PSS is mapped to symbols after the first symbol among the symbols related to the S-SSB, wherein the S-SSS is mapped to symbols after the symbols related to the S-PSS among the symbols related to the S-SSB, and wherein the PSBCH is mapped to the first symbol among the symbols related to the S-SSB and symbols after the symbols related to the S-SSS.

For example, the S-SSB may be received with a subcarrier spacing (SCS) of 15 kHz or higher.

Meanwhile, the wireless interface between a UE and a UE or the wireless interface between a UE and a network may be composed of an L1 layer, an L2 layer, and an L3 layer. In this specification, for example, an L1 layer may mean a PHYSICAL layer. Also, for example, an L2 layer may mean at least one of a MAC layer, an RLC layer, and a PDCP layer, and an SDAP layer. Also, for example, an L3 layer may mean an RRC layer.

On the other hand, in this specification, for example, a transmitting UE (TX UE) may be a UE transmitting data to a receiving UE (RX UE). For example, a receiving UE may include a target UE. For example, a transmitting UE may include a UE performing PSCCH and/or PSSCH transmission. And/or, for example, a transmitting UE may include a UE transmitting an SL CSI-RS and/or an SL CSI report request indicator to a receiving UE. And/or, for example, a transmitting UE may be a UE transmitting a channel and/or a reference signal on channel, to be used for SL radio link monitoring (RLM) and/or SL radio link failure (RLF) operation of a receiving UE. For example, the channel may include a control channel. For example, the channel may include PSCCH and/or PSSCH. For example, the reference signal may include a DM-RS and/or an SCI-RS. And/or, a transmitting UE may include a UE transmitting a sidelink synchronization signal block or a sidelink SS/PSBCH block to a receiving UE.

Meanwhile, in this specification, for example, a receiving UE may include a UE that transmits SL hybrid automatic repeat request (HARQ) feedback to a transmitting UE according to whether decoding of data received from the transmitting UE succeeds in decoding and/or whether the detection/decoding of a PSCCH transmitted by the transmitting UE is successful. For example, a PSCCH may include a channel related to PSSCH scheduling. And/or, a receiving UE may include a UE that performs SL CSI transmission to a transmitting UE based on an SL CSI-RS and/or SL CSI report request indicator received from the transmitting UE. And/or, a receiving UE may be a UE transmitting an SL (L1) RSRP measurement value measured based on a reference signal and/or SL (L1) reference signal received power (RSRP) report request indicator received from a transmitting UE to a transmitting UE. For example, a reference signal may be predefined. And/or, a receiving UE may be a UE that transmits its own data to a transmitting UE. And/or, a receiving UE may be a UE performing SL RLM and/or SL RLF operation based on a channel received from a transmitting UE and/or a reference signal on a channel. For example, a channel may include a control channel. For example, a channel and/or a reference signal on the channel may be pre-configured. And/or, a receiving UE may be a UE that receives an S-SSB or sidelink SS/PSBCH block from a transmitting UE and performs synchronization.

Meanwhile, in the NR V2X communication system, a transmitting UE may transmit an S-SSB or a sidelink SS/PSBCH block to a receiving UE. A receiving UE may perform initial access using an S-SSB or sidelink SS/PSBCH block received from a transmitting UE. An S-SSB or sidelink SS/PSBCH block may include a sidelink main synchronization signal, a sidelink sub-synchronization signal, and a sidelink physical broadcast channel. A receiving UE may obtain initial signal detection and synchronization by using an S-PSS received from a transmitting UE. A receiving UE may obtain detailed synchronization by using an S-SSS received from a transmitting UE together with an S-PSS signal, and may detect ae synchronization signal ID. A receiving UE may receive a MIB through PSBCH received from a transmitting UE, and may obtain basic system information included in the MIB. Therefore, an S-PSS, an SS and a PSBCH included in an S-SSB or an sidelink SS/PSBCH block may be very important signals for a receiving UE to acquire synchronization and basic system information, and for normal data communication, a receiving UE may have to initially receive and decode an S-SSB.

Meanwhile, in NR sidelink system, a plurality of numerologies having different carrier intervals and/or cyclic prefix (CP) lengths may be supported. In this case, as the size of an SCS increases, the length of a time resource for a transmitting UE to transmit an S-SSB may be shortened, thereby reducing the coverage of an S-SSB. Therefore, in order to guarantee the coverage of an S-SSB, the number of S-SSBs that a transmitting UE transmits to a receiving UE within a transmission period (e.g., 160 ms) of a specific S-SSB according to the size of SCS may be pre-configured or configured to a transmitting UE in one or more numbers. For example, when the size of SCS is 15 kHz, a transmitting UE may transmit one or two S-SSBs to a receiving UE within one S-SSB transmission period. For example, when the size of SCS is 30 kHz, a transmitting UE may transmit one or two S-SSBs to a receiving UE within one S-SSB transmission period.

On the other hand, when the size of SCS is 60 kHz, it is possible to support two types of CP, the structure of an S-SSB transmitted from a transmitting UE to a receiving UE may be different according to CP type. In this case, the CP type may include a Normal CP (NCP) or an Extended CP (ECP). Specifically, for example, when CP type is NCP, the number of symbols for mapping PSBCH in an S-SSB transmitted by a transmitting UE may be 9 or 8. On the other hand, for example, when CP type is ECP, the number of symbols for mapping PSBCH in an S-SSB transmitted by a transmitting UE may be 7 or 6. For example, when CP type is NCP, the structure of an S-SSB, that is, the order of symbols to which S-PSS, S-SSS, and PSBCH are mapped in an S-SSB transmitted by a transmitting UE may refer to FIG. 18. For example, when CP type is ECP, unlike FIG. 18, the number of symbols to which a transmitting UE maps PSBCH after an S-SSS in an S-SSB may be six. Accordingly, the coverage of an S-SSB may be different depending on whether CP type is NCP or ECP.

Figure 18:
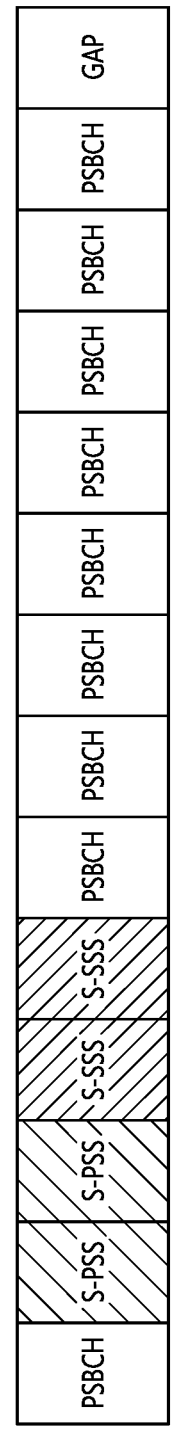
FIG. 18 shows a structure of an S-SSB according to an embodiment of the present disclosure.

FIG. 18 shows a structure of an S-SSB according to an embodiment of the present disclosure. The embodiment of FIG. 18 may be combined with various embodiments of the present disclosure.

Referring to FIG. 18, symbols related to S-SSB may consist of 14 symbols. For example, the first symbol among symbols related to an S-SSB may be a symbol related to PSBCH. For example, the second and third symbols among the symbols related to the S-SSB may be symbols related to an S-PSS. For example, among the symbols related to the S-SSB, the fourth and fifth symbols may be symbols related to an S-SSS. For example, among the symbols related to the S-SSB, symbols after the symbol related to an S-SSS may be symbols related to PSBCH. For example, the last symbol among the symbols related to an S-SSB may be a gap symbol.

Meanwhile, for V2X communication, it is necessary for a UE to select a reference synchronization signal and to transmit the selected synchronization signal to neighboring UEs so that synchronization between UEs is extended. At this time, each UE may select global navigation satellite system (GNSS), gNB/eNB, or a UE as its synchronization source according to (pre-)configured rules, and in the (pre-)configured rule, a priority required for selecting each candidate synchronization source as a synchronization source of a UE is defined. Each UE selects and uses a final synchronization source from neighboring synchronization sources according to a rule defined or configured in advance as described above. In this case, a UE may select a final synchronization source based on received RSRP and/or a predetermined or configured threshold, when there are multiple synchronization sources having the same priority.

A synchronization source can be largely divided into a GNSS and a base station. For example, the base station may include a gNB/eNB or the like. Table 5 below shows priority related to synchronization source selection used in LTE-V2X.

TABLE 5

| GNSS-based synchronization | eNB-based synchronization |
|---|---|
| P0: GNSS | P0: eNB |
| P1: UE directly synchronized to GNSS | P1: UE directly synchronized to eNB |
| P2: UE indirectly synchronized to GNSS | P2: UE indirectly synchronized to eNB |
| P3: the remaining UEs have the lowest priority | P3: GNSS |
| | P4: UE directly synchronized to GNSS |
| | P5: UE indirectly synchronized to GNSS |
| | P6: the remaining UEs have the lowest priority |

As shown in Table 5 above, priority for synchronization source selection can be largely divided into a case in which a GNSS in the left column has the highest priority and a case in which a base station has the highest priority as in the right column. For example, P0 to P6 each indicate a priority, and a smaller number next to P indicates a higher priority.

According to the existing technology based on Table 5 above, UEs existing within the coverage of a base station (in-coverage, INC) may be configured to use the right column, and UEs existing outside the coverage of a base station (out-of-coverage, OOC) may be configured to use the left column. Here, according to the existing technology, there may be an advantage that UEs that uses the synchronization of an eNB by cross-carrier scheduling, such as a UE operating in an intelligent transportation systems band (ITS) and UEs using GNSS synchronization may form a cluster according to the mutual RSRP level, and the UEs forming each cluster within the cluster may communicate. However, since UEs are not mandated to transmit an SLSS, in the worst case, when a UE loses GNSS synchronization, there is no synchronization source in the vicinity of the UE, and all UEs operate as independent synchronization sources. The present disclosure solves this problem and proposes a method for stably selecting a synchronization source even when GNSS is selected as a synchronization source with the highest priority.

As in the above problem, when a UE selects GNSS as the highest priority synchronization source, in order to secure a stable synchronization source even when the UE loses GNSS synchronization due to factors such as a building or an overpass, the UE may need to be able to directly select a base station as a synchronization source without relying only on another UE that does not delegate SLSS transmission. Table 6 below is an example of implementing such a method.

TABLE 6

| GNSS-based synchronization | gNB/eNB-based synchronization |
|---|---|
| P0: GNSS | P0: gNB/eNB |
| P1: UE directly synchronized to GNSS | P1: UE directly synchronized to gNB/eNB |
| P2: UE indirectly synchronized to GNSS | P2: UE indirectly synchronized to gNB/eNB |
| P3: gNB/eNB | P3: GNSS |
| P4: UE directly synchronized to gNB/eNB | P4: UE directly synchronized to GNSS |
| P5: UE indirectly synchronized to gNB/eNB | P5: UE indirectly synchronized to GNSS |
| P6: the remaining UEs have the lowest priority | P6: the remaining UEs have the lowest priority |

Referring to table 6 above, base stations including gNB/eNB and UEs that have selected it as a synchronization source are included in a synchronization source selection table that prioritizes GNSS. Therefore, a gNB/eNB that always transmits an SLSS may be selected as a synchronization source, even if a UE loses GNSS synchronization due to blocking.

Although a synchronization source selection method based on the above table has advantages described above, it may also have following disadvantages. That is, when a base station including gNB/eNB does not synchronize with GNSS and uses independent synchronization, a case in which UEs synchronized with GNSS and UEs synchronized with gNB/eNB coexist within coverage may occur. That is, when UEs whose GNSS cannot be seen due to path obstruction, etc., select gNB/eNB as a synchronization source and operate, the UEs do not synchronize with other UEs in the vicinity that operate by selecting GNSS as a synchronization source, resulting in a communication problem.

In order to solve the above problem, when a gNB/eNB does not synchronize with a GNSS due to high layer signaling, a UE may not select P3, P4, or P5 from the left column, or when a gNB/eNB is synchronized with a GNSS, a UE may use the left column as it is. At this time, if a gNB/eNB does not synchronize with a GNSS, since it is necessary to enable UEs synchronized with a base station and UEs synchronized with a GNSS to form an independent sync cluster, respectively, a table for selecting a synchronization source may be selected as shown in Tables 7 and 8 below.

TABLE 7

| GNSS-based synchronization | gNB/eNB-based synchronization |
| --- | --- |
| P0: GNSS | P0: gNB/eNB |
| P1: UE directly synchronized to GNSS | P1: UE directly synchronized to gNB/eNB |
| P2: UE indirectly synchronized to GNSS | P2: UE indirectly synchronized to gNB/eNB |
| P3: gNB/eNB | P3: GNSS |
| P4: UE directly synchronized to gNB/eNB | P4: UE directly synchronized to GNSS |
| P5: UE indirectly synchronized to gNB/eNB | P5: UE indirectly synchronized to GNSS |
| P6: the remaining UEs have the lowest priority | P6: the remaining UEs have the lowest priority |

Table 7 shows priority related to synchronization source selection that can be selected when a base station (eNB/gNB) and a GNSS are in synchronization with each other.

TABLE 8

| GNSS-based synchronization | eNB-based synchronization |
| --- | --- |
| P0: GNSS | P0: eNB |
| P1: UE directly synchronized to GNSS UE directly synchronized to eNB | P1: UE directly synchronized to eNB |
| | P2: UE indirectly synchronized to eNB |
| P2: UE indirectly synchronized to GNSS UE indirectly synchronized to eNB | P3: GNSS |
| | P4: UE directly synchronized to GNSS |
| P3: the remaining UEs have the lowest priority | P5: UE indirectly synchronized to GNSS |
| | P6: the remaining UEs have the lowest priority |

Table 8 shows priority related to synchronization source selection that can be selected when a base station (eNB/gNB) and a GNSS are out of synchronization with each other.

For example, a configuration in which the tables of Tables 7 and 8 are selected according to whether a base station and a GNSS are synchronized may be configured or pre-configured for a UE by higher layer signaling including RRC or MAC control element (CE). Therefore, for example, a UE may select/determine either the table of Table 7 or the table of Table 8 according to whether a base station and a GNSS are synchronized.

The present disclosure proposes a method, in (pre-) configuring rules for synchronization source selection made with the highest priority of GNSS or base station, for enabling a UE to stably select a synchronization source if the UE selects a rule that uses GNSS as the highest priority synchronization source, even if the UE loses the GNSS due to path obstruction, etc., and a method for configuring priority related to synchronization source selection, in which UEs selecting a base station as a synchronization source and UEs selecting a GNSS as a synchronization source independently form a cluster to perform communication efficiently.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
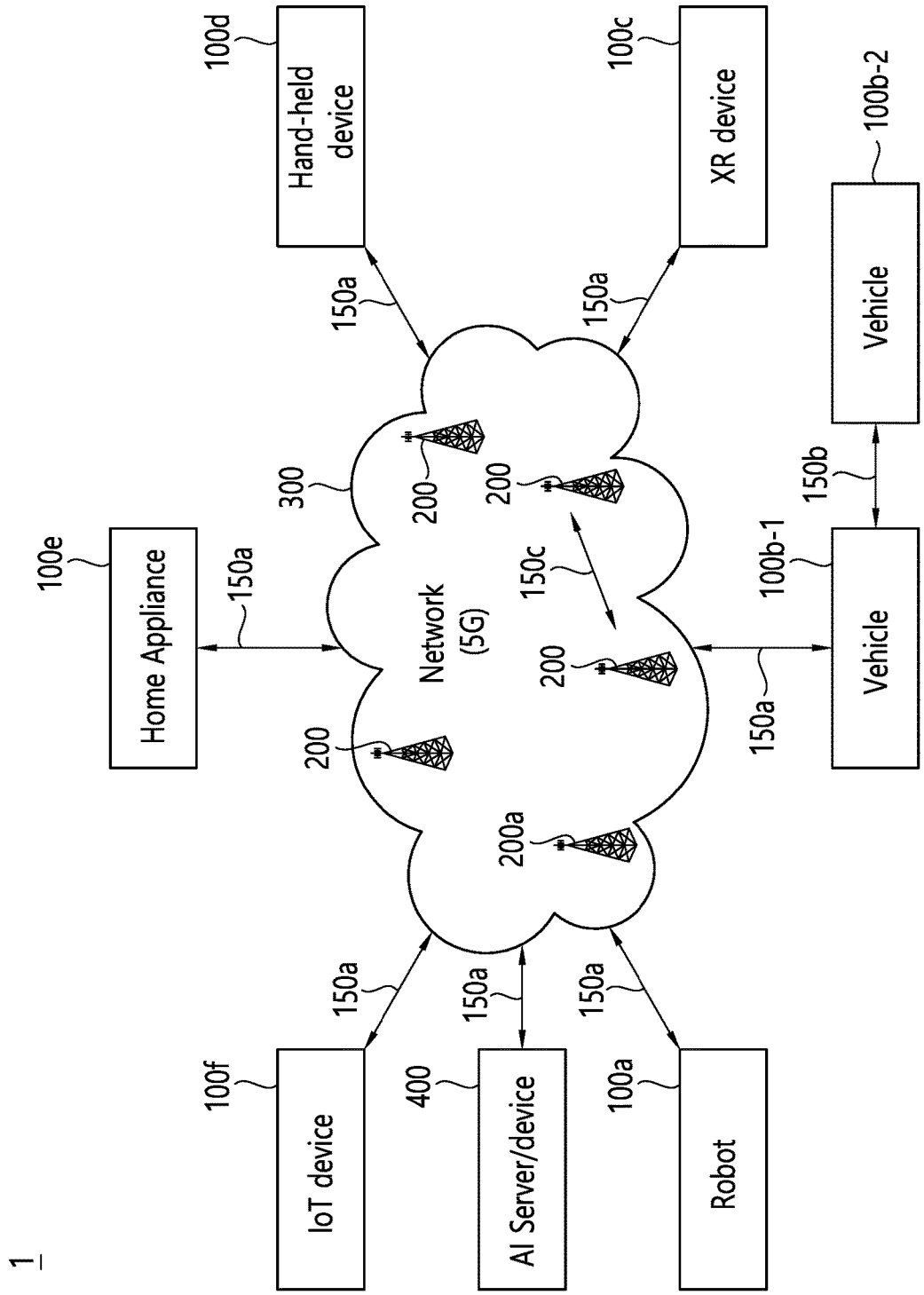
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
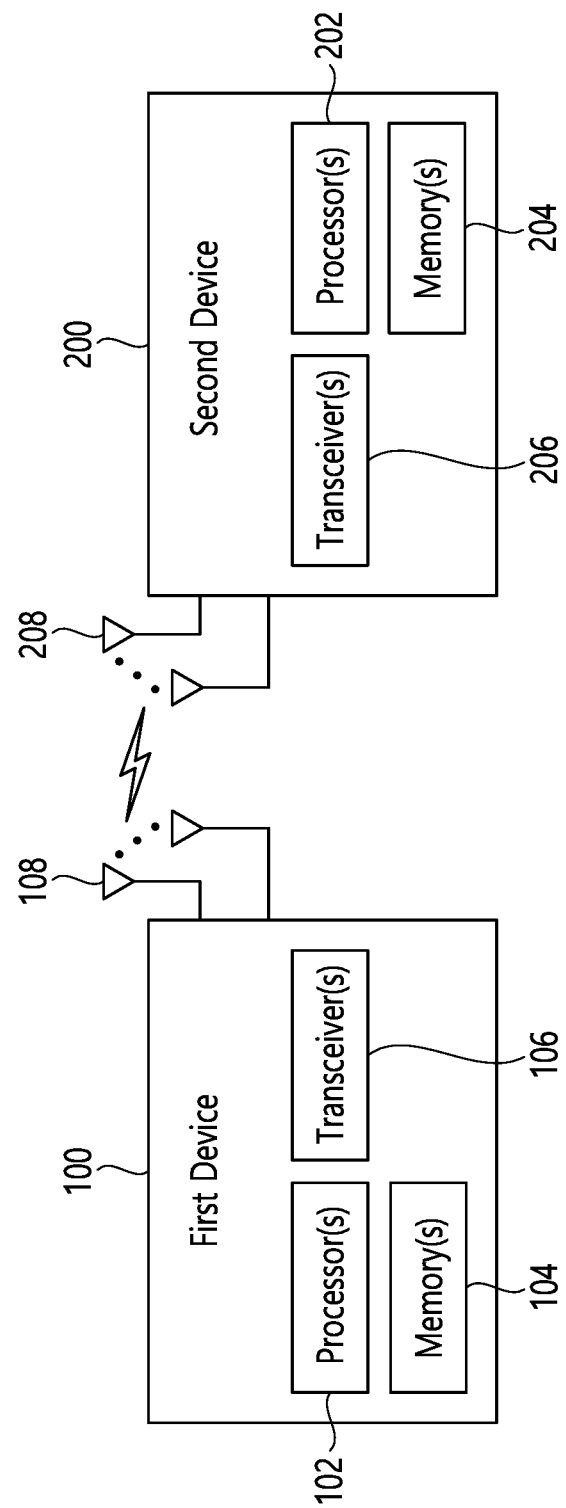
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
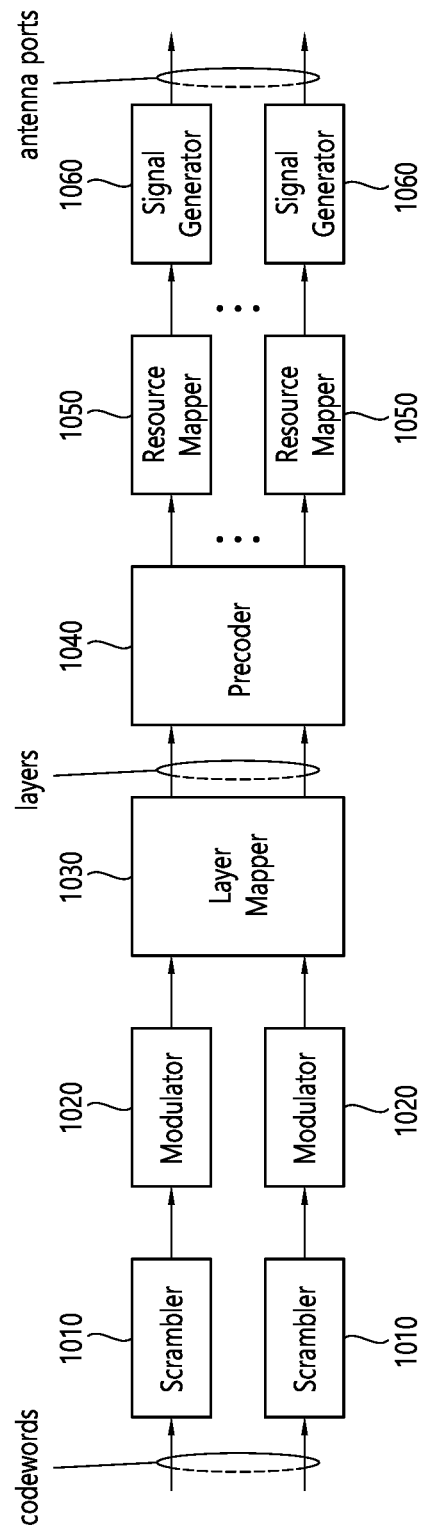
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
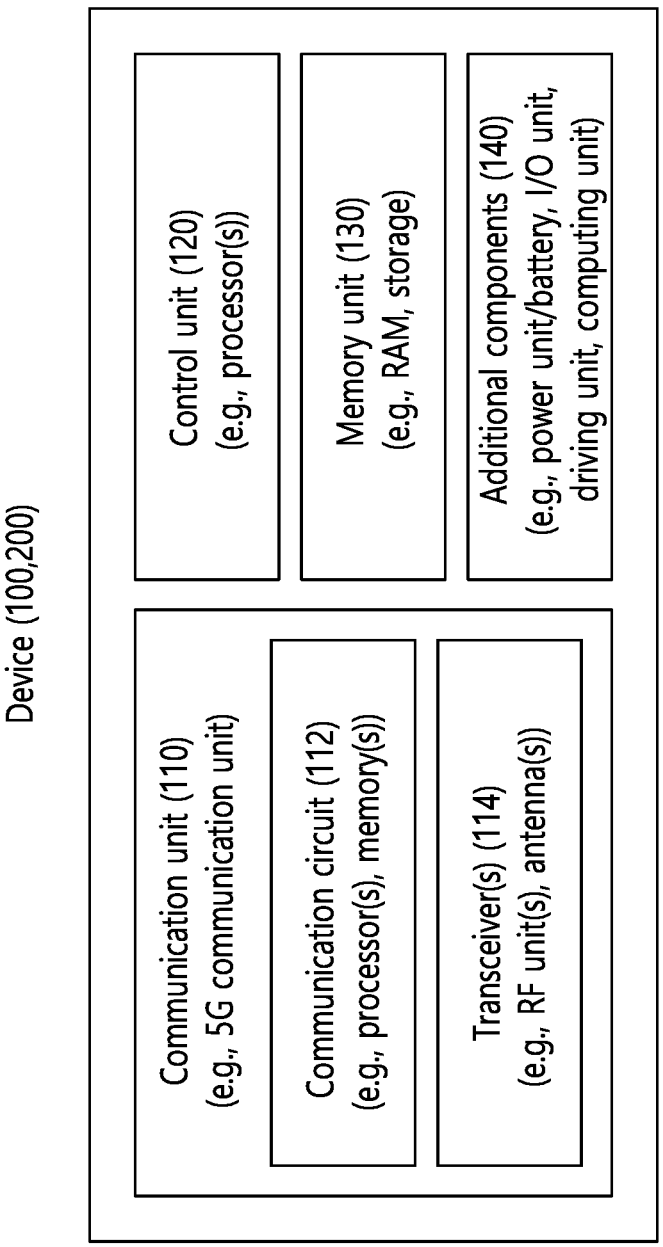
FIG. 22 shows a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
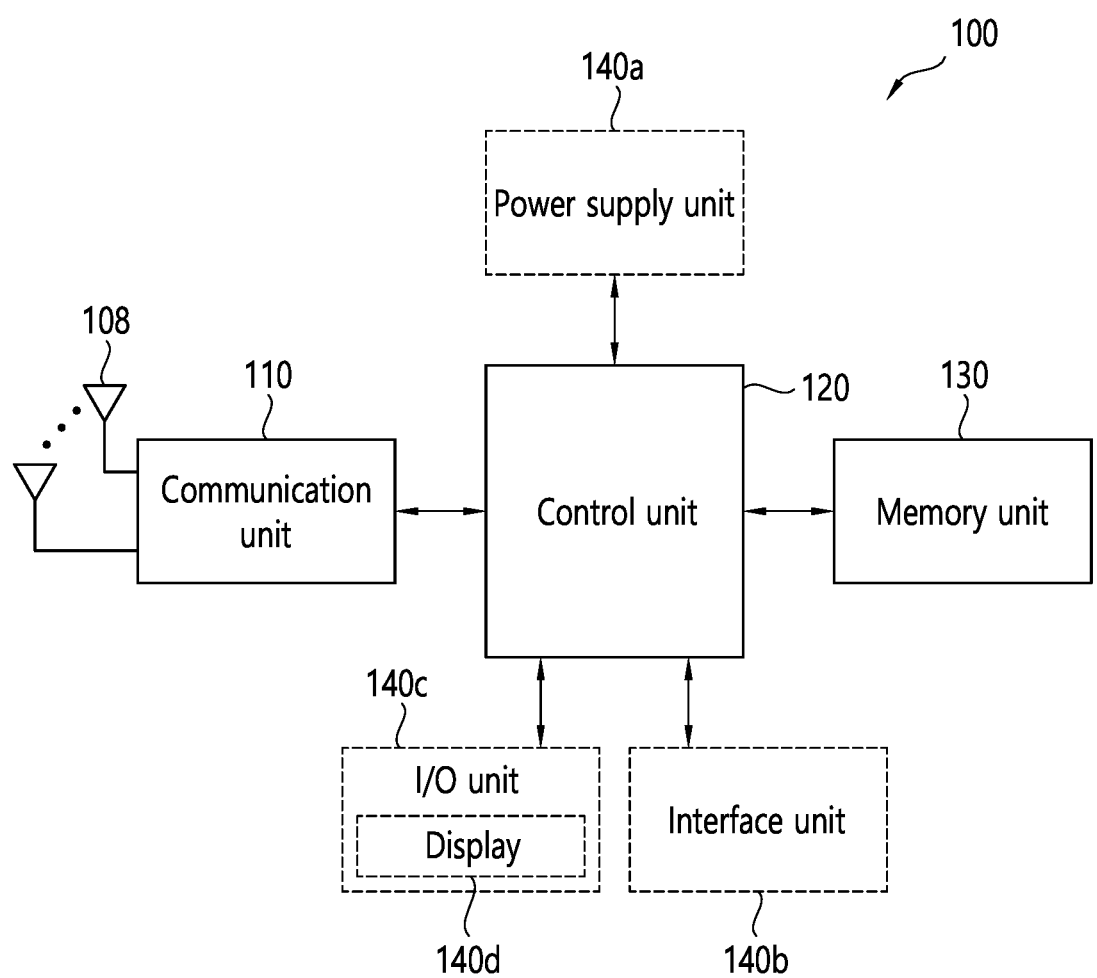
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
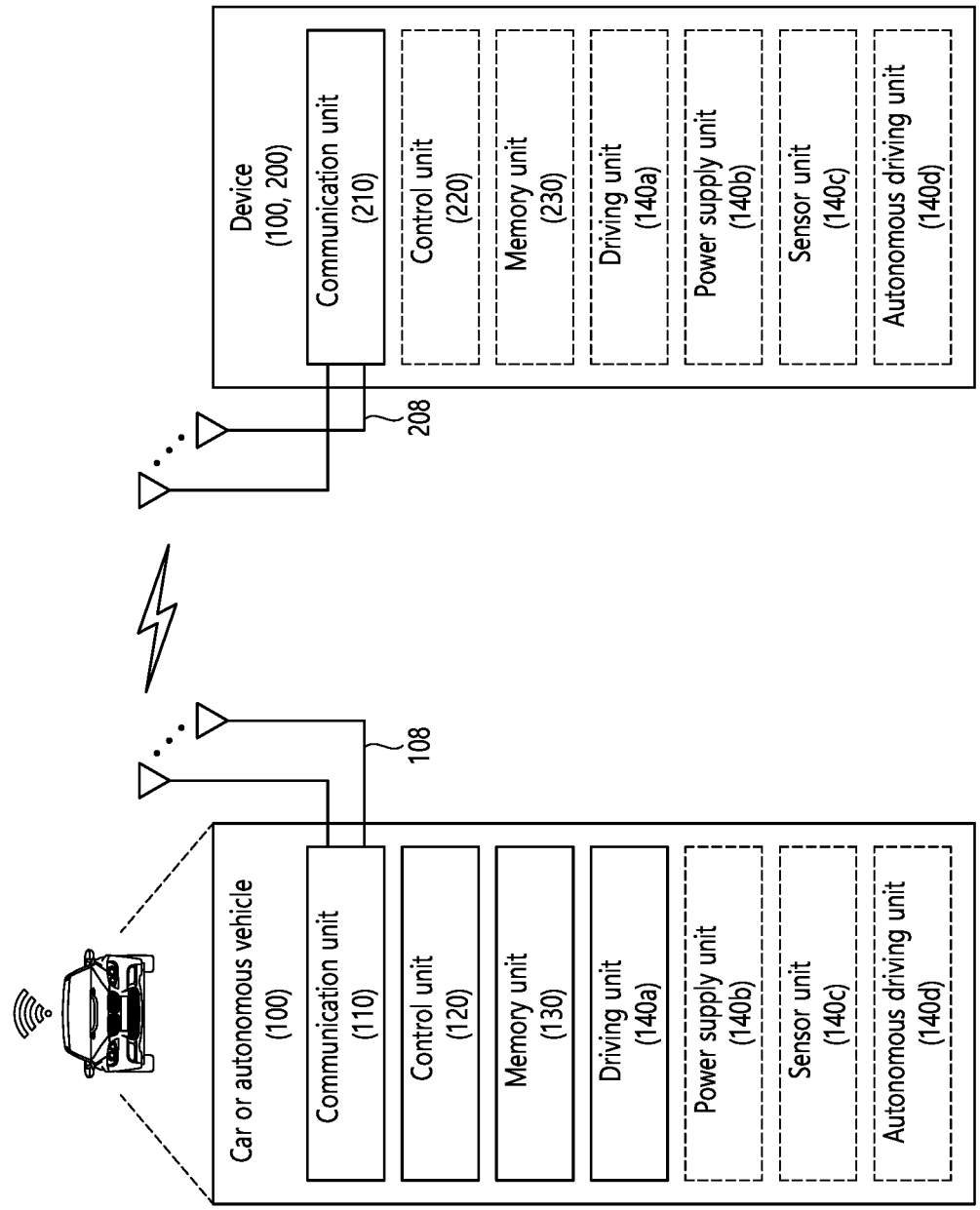
FIG. 24 shows a car or an autonomous vehicle, in accordance with an embodiment of the present disclosure.

FIG. 24 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically configuring a path if a destination is configured, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
    generating an aggregated sidelink synchronization signal block (S-SSB),
    wherein symbols related to the S-SSB include three or more contiguous symbols related to a sidelink primary synchronization signal (S-PSS), three or more contiguous symbols related to a sidelink secondary synchronization signal (S-SSS), and eleven or more symbols related to physical broadcast channel (PSBCH),
    wherein the S-PSS is mapped to symbols after the first symbol among the symbols related to the S-SSB, wherein the S-SSS is mapped to symbols after the symbols related to the S-PSS among the symbols related to the S-SSB, and wherein the PSBCH is mapped to the first symbol among the symbols related to the S-SSB and symbols after the symbols related to the S-SSS; and transmitting the S-SSB to a second apparatus, wherein symbols after the symbols related to the S-SSS among the symbols related to the PSBCH are contiguous, and wherein a codeword mapped to the symbols after the symbols related to the S-SSS among the symbols related to the PSBCH is coded at a lower code rate than a non-aggregated S-SSB.

2. The method of claim 1, wherein the S-SSB is transmitted with a subcarrier spacing (SCS) of 30 kHz or higher.

3. The method of claim 1, wherein a length of a sequence related to the S-PSS is longer than 127.

4. The method of claim 3,
wherein the symbols related to the S-SSB include an S-PSS symbol group,
wherein the S-PSS symbol group includes the symbols related to the S-PSS, and
wherein the sequence related to the S-PSS is mapped to the S-PSS symbol group.

5. The method of claim 1, wherein a length of a sequence related to the S-SSS is longer than 127.

6. The method of claim 5,
wherein the symbols related to the S-SSB include an S-SSS symbol group,
wherein the S-SSS symbol group includes the symbols related to the S-SSS, and
wherein the sequence related to the S-SSS is mapped to the S-SSS symbol group.

7. The method of claim 1,
wherein the symbols related to the S-SSB includes 14*N symbols, and
wherein the N is an integer greater than or equal to 2.

8. The method of claim 1,
wherein the symbols related to the S-SSB include a PSBCH symbol group,
wherein the PSBCH symbol group includes the symbols after the symbols related to the S-SSS among the symbols related to the PSBCH, and
wherein the codeword is mapped to the PSBCH symbol group.

9. The method of claim 1, wherein automatic gain control (AGC) is performed in a period related to the first symbol among the symbols related to the S-SSB.

10. The method of claim 1, wherein switching is performed in a period related to the last symbol among the symbols related to the S-SSB.

11. The method of claim 1, wherein the symbols related to the S-SSB include one symbol of the symbols related to the PSBCH between the symbols related to the S-PSS and the symbols related to the S-SSS.

12. The method of claim 11, wherein a period related to the one symbol of the symbols related to the PSBCH, included between the symbols related to the S-PSS and the symbols related to the S-SSS, includes a transient period.

13. A first apparatus for performing wireless communication, the first apparatus comprising:
one or more memories storing instructions;
one or more transceivers; and
one or more processors connected to the one or more memories and the one or more transceivers, wherein the one or more processors execute the instructions to:
generate an aggregated sidelink synchronization signal block (S-SSB),
wherein symbols related to the S-SSB include three or more contiguous symbols related to a sidelink primary synchronization signal (S-PSS), three or more contiguous symbols related to a sidelink secondary synchronization signal (S-SSS), and eleven or more symbols related to physical broadcast channel (PSBCH),
wherein the S-PSS is mapped to symbols after the first symbol among the symbols related to the S-SSB,
wherein the S-SSS is mapped to symbols after the symbols related to the S-PSS among the symbols related to the S-SSB, and
wherein the PSBCH is mapped to the first symbol among the symbols related to the S-SSB and symbols after the symbols related to the S-SSS; and
transmit the S-SSB to a second apparatus,
wherein symbols after the symbols related to the S-SSS among the symbols related to the PSBCH are contiguous, and
wherein a codeword mapped to the symbols after the symbols related to the S-SSS among the symbols related to the PSBCH is coded at a lower code rate than a non-aggregated S-SSB.

14. An apparatus configured to control a first user equipment (UE), the apparatus comprising:
one or more processors; and
one or more memories operably connectable to the one or more processors and storing instructions, wherein the one or more processors execute the instructions to:
generate an aggregated sidelink synchronization signal block (S-SSB),
wherein symbols related to the S-SSB include three or more contiguous symbols related to a sidelink primary synchronization signal (S-PSS), three or more contiguous symbols related to a sidelink secondary synchronization signal (S-SSS), and eleven or more symbols related to physical broadcast channel (PSBCH),
wherein the S-PSS is mapped to symbols after the first symbol among the symbols related to the S-SSB,
wherein the S-SSS is mapped to symbols after the symbols related to the S-PSS among the symbols related to the S-SSB, and
wherein the PSBCH is mapped to the first symbol among the symbols related to the S-SSB and symbols after the symbols related to the S-SSS; and
transmit the S-SSB to a second UE,
wherein symbols after the symbols related to the S-SSS among the symbols related to the PSBCH are contiguous, and
wherein a codeword mapped to the symbols after the symbols related to the S-SSS among the symbols related to the PSBCH is coded at a lower code rate than a non-aggregated S-SSB.

* * * * *